(12) United States Patent
Bradfield (10) Patent No.: US 9,154,022 B2
(45) Date of Patent: Oct. 6, 2015

(54) HIGH EFFICIENCY B+ CONNECTION

(71) Applicant: Remy Technologies, LLC, Pendleton, IN (US)

(72) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 272 days.

(21) Appl. No.: 13/801,811

(22) Filed: Mar. 13, 2013

(65) Prior Publication Data

US 2014/0265671 A1    Sep. 18, 2014

(51) Int. Cl.
*H02K 11/04* (2006.01)
*H02K 5/22* (2006.01)
*H01R 43/04* (2006.01)
*H01R 43/02* (2006.01)
*H02K 9/02* (2006.01)

(52) U.S. Cl.
CPC .............. *H02K 11/046* (2013.01); *H01R 43/02* (2013.01); *H01R 43/04* (2013.01); *H02K 5/225* (2013.01); *H02K 9/02* (2013.01); *Y02T 10/641* (2013.01)

(58) Field of Classification Search
CPC ..... H02K 11/046; H02K 19/36; H02K 5/225; H02K 19/365; H02K 15/00; H02K 15/14; H01R 43/00; H01R 43/20; H01R 43/048; H01R 43/04; H01R 43/02; Y10T 29/49009; Y10T 29/49147; Y10T 29/49169; Y10T 29/49208
USPC ................................................. 310/68 D, 71
See application file for complete search history.

(56) References Cited

U.S. PATENT DOCUMENTS

2008/0018186 A1*   1/2008   Lybbert ........................... 310/71
2011/0241497 A1*  10/2011   Amaral ....................... 310/60 R

* cited by examiner

*Primary Examiner* — Burton Mullins
*Assistant Examiner* — Mark R Carter
(74) *Attorney, Agent, or Firm* — Bose McKinney & Evans LLP (57) ABSTRACT

An alternator includes a B+ bolt, rectifier B+ terminals, a bus having bends respectively surrounding ones of the rectifier B+ terminals and having an end formed into a ring terminal, and a stop, where the bus ring terminal is placed onto the B+ bolt and a load cable ring terminal may be placed onto the B+ bolt in direct contact with the bus ring terminal and secured thereto by the stop. A method of connecting B+ on an alternator includes bending a copper bus conductor so that one side of the bus conductor surrounds and abuts each of the rectifier B+ terminals, shaping one end of the bus conductor into a ring terminal, and placing the ring terminal of the bus conductor onto the B+ stud. A method includes coupling the B+ terminals and the B+ stud together with a copper bus conductor, and cooling the copper bus conductor.

19 Claims, 14 Drawing Sheets

PRIOR ART

HIGH EFFICIENCY B+ CONNECTION

BACKGROUND

The present invention relates to improving efficiencies of an electric machine and, more particularly, to structure and methodology for optimizing the B+ connections of an alternator.

The rotor of an automotive alternator is typically driven by a belt and pulley system to rotate within stator windings coiled on a laminated iron frame. The magnetic field from the spinning rotor induces an alternating voltage into the stator windings. The alternating voltage (AC) is typically then converted to a direct current (DC) voltage by diode rectifiers that output the DC voltage to one or more batteries and to electrical devices of a vehicle. Such DC voltage being output by the alternator to the battery may be, for example, approximately 14 volts, which is generally at least one volt more than a conventional vehicle's battery voltage, for example 12.7 volts. The term "B+" refers specifically to the voltage at the battery positive post, as distinguished from the alternator output voltage. However, since the alternator output at the rectifier terminals is connected to the battery and the voltage drop in the charging/battery cable is generally low, the 'connection' between the alternator output and the battery positive terminal, as used herein, is referred to as the B+ connection because the charging/battery cable is connected to the battery B+ stud. For simplicity, any portion electrically common to the B+ connection may be referred to herein using the term B+ as a generic identifier.

Modern automotive alternators are generally required to supply ever-greater amounts of electrical current. For example, hybrid and electric vehicles may use electricity instead of internal combustion for driving the wheels, and an alternator may be combined with a starter in a mild hybrid configuration such as in a belt alternator starter (BAS) system. Other electrical loadings from air conditioning, electric power steering, and various vehicle systems further increase the required alternator electrical capacity. As a result, efficiency of automotive alternators needs to be optimized. Efficiency is generally limited by fan cooling loss, bearing loss, iron loss, copper loss, and the voltage drop in the rectifier bridges. The use of permanent magnets may increase efficiency by providing field flux without relying on a wound field that inherently creates ohmic losses. An alternator may have dual internal fans to improve operating efficiency and durability and to reduce heat-related failures. Many conventional alternator systems are addressed to such concerns. However, additional improvements may be obtained by reducing electrical resistances of B+ connections. By reducing electrical losses in the B+ connection(s), the electrical losses and thermal limitations of the rectifier circuit are also reduced.

SUMMARY

It is therefore desirable to obviate the above-mentioned disadvantages by providing high efficiency B+ connections, an alternator system, and associated methodology, whereby connection resistance in the B+ portion of the alternator is significantly reduced.

According to an exemplary embodiment, an alternator includes a B+ bolt, a plurality of rectifier B+ terminals, a bus conductor having a plurality of bends respectively surrounding ones of the rectifier B+ terminals and having an end formed into a bus ring terminal, and a stop, where the bus ring terminal is placed onto the B+ bolt and a load cable ring terminal may be placed onto the B+ bolt in direct contact with the bus ring terminal and secured thereto by the stop. In some embodiments, the stop may take the form of a nut.

According to another exemplary embodiment, a method of connecting B+ on an alternator having a plurality of rectifier B+ terminals and a B+ stud includes bending a copper bus conductor so that one side of the bus conductor surrounds and abuts each of the rectifier B+ terminals, shaping one end of the bus conductor into a ring terminal, and placing the ring terminal of the bus conductor onto the B+ stud.

According to a further exemplary embodiment, a method of connecting B+ on an alternator having a plurality of rectifier B+ terminals and a B+ stud includes providing a plurality of rectifier modules each having one of the B+ terminals surrounded by an electrically insulative cover, coupling the B+ terminals and the B+ stud together with a copper bus conductor, and cooling the copper bus conductor.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein.

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1A:
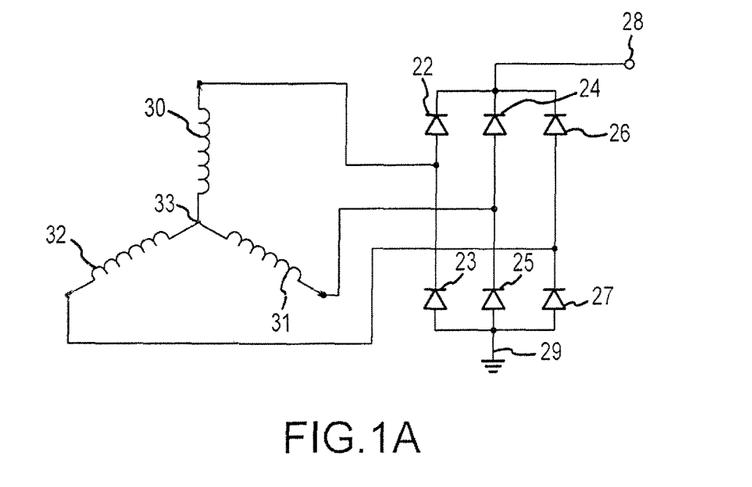
FIGS. 1A and 1B are simplified electrical schematic diagrams of two exemplary types of alternator circuits, the first employing rectifier diodes and the latter utilizing MOSFET devices in a rectifying circuit.
Figure 1B:
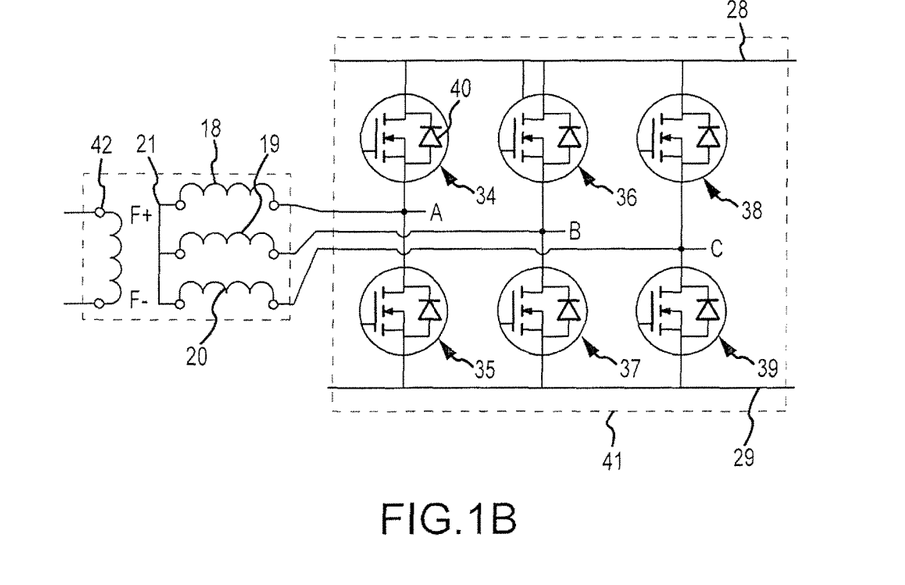

FIGS. 1A and 1B are simplified electrical schematic diagrams of two exemplary types of alternator circuits, the first employing rectifier diodes and the latter utilizing MOSFET devices in a rectifying circuit. In FIG. 1A, a stator winding has a wye configuration. One end of A coil 30 is connected to the anode of rectifier diode 22 and to the cathode of rectifier diode 23. One end of B coil 31 is connected to the anode of rectifier diode 24 and to the cathode of rectifier diode 25. One end of C coil 32 is connected to the anode of rectifier diode 26 and to the cathode of rectifier diode 27. The respective other ends of coils 30, 31, 32 are connected in common to a neutral 33.

In FIG. 1B, a rectifying bridge circuit 41 has three pairs of MOSFET devices rather than three pairs of rectifying diodes. The rotating field coil 42 of an alternator rotor generates alternating current in phases A, B, C of respective stator windings 18-20. One end of each coil 18, 19, 20 is connected in common at a neutral connection 21, and the three other respective ends of coils 18, 19, 20 are each connected to a MOSFET pair. An upper half of circuit 41 includes MOSFET devices 34, 36, 38 and a lower half of circuit 41 includes MOSFET devices 35, 37, 39. MOSFET devices 34-39 may each include a diode 40 connected between the respective source and drain thereof. Such diodes 40 are commonly referred to as anti-parallel or free-wheeling diodes, and are typically incorporated into the same package as the respective MOSFET. As with any of the rectifying circuits of FIGS. 3A-3C, the MOSFET pairs 34 and 35, 36 and 37, and 38 and 39 are respectively connected to phases A, B, C for rectifying the alternating current (AC) signals and supplying direct current (DC) to B+ bus 28 and ground 29.

Many other devices may alternatively be utilized for rectifying the AC signals of an alternator stator. For example, JFET, BJT, IGBT, and/or other devices may be used. The configurations of FIGS. 1A and 1B are merely illustrative. Many other configurations may be utilized in a rectifying circuit of a given alternator including, for example, any number of wye and/or delta coil sets, tuned and/or matched windings, auxiliary windings, tapped coils, etc.

Figure 2:
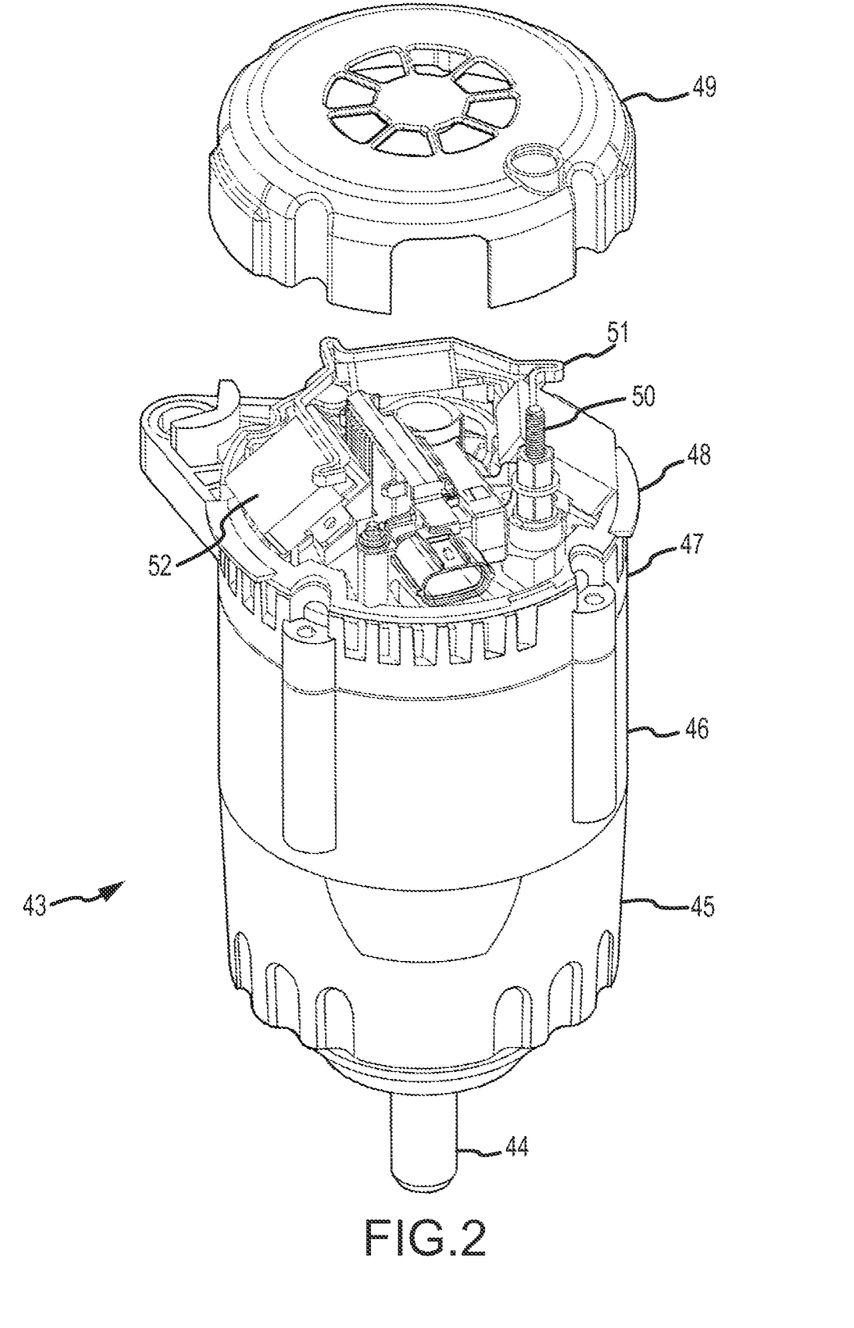
FIG. 2 is a perspective view of an alternator, according to an exemplary embodiment.

FIG. 2 is a perspective view of an alternator 43, according to an exemplary embodiment. Alternator 43 includes a rotating shaft 44, a lower housing 45, an upper housing 46, a frame assembly 47, a phase lead insulator 48, and a cover 49. Frame assembly 47 provides mounting and cooling features for power electronics components typically including a voltage regulator and one or more rectifier modules 52. The DC outputs of the rectifiers are coupled to a B+ terminal post 50 via a B+ bus bar 51. Several parts are omitted from FIG. 2 for illustration purposes.

Figure 3:
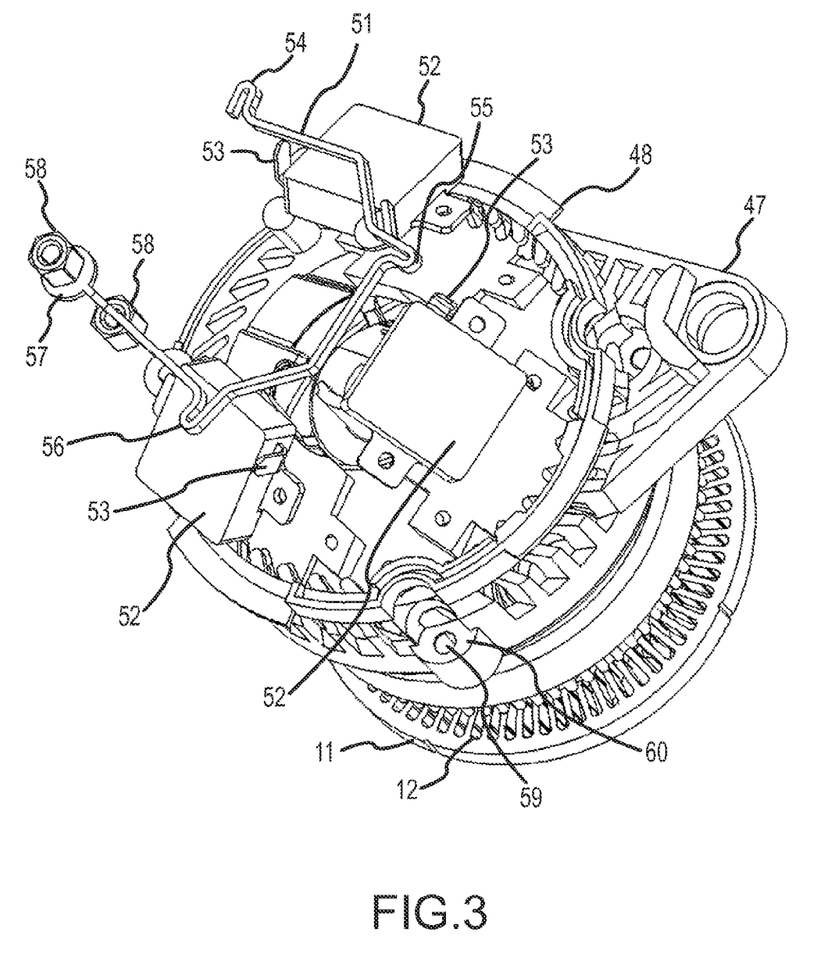
FIG. 3 is a perspective, partially-exploded view of selected portions of the alternator of FIG. 2.

FIG. 3 is a perspective, partially-exploded view of selected portions of alternator 43. Each of three rectifier modules 52 has a respective B+ output voltage terminal 53, and the three terminals 53 are electrically connected to B+ bus bar 51 at respective bend portions 54, 55, 56. For example, such connections may be made by crimping, welding, soldering, brazing, connectors, etc. An end portion of B+ bus bar 51 may be formed as a ring type terminal 57 that is secured to B+ terminal post 50 (FIG. 2) with nuts 58. Housing portions 45, 46 (FIG. 2) are omitted from FIG. 3 in order to illustrate the relation between frame 47 and a stator core 11 having slots 12. Frame 47 has four bolt holes 59 that may each be a same radial distance from a center longitudinal axis 3 (FIG. 5) of an alternator, and that may each be defined by a surrounding fastening surface 60. For example, four fastening surfaces 60 may be coplanar with one another and may each be formed to receive a washer, lock washer, bolt head, nut, or other fastening object. In such a case, four axially extending fasteners such as bolts or threaded rod may be placed into bolt holes 59 so that the distal end of each fastener may be secured to a corresponding fastening surface at the other axial end of alternator 43. Such fasteners may then be tightened with a specified torque so that the alternator 43 assembly is held together by axial compression, with four compression locations each being substantially the same radial distance from alternator center axis 3. When fastening surfaces 60, and their corresponding surfaces at the opposite axial end of the compression, are coplanar and substantially perpendicular to the center axis, the axial length of the compressed assembly is uniform and symmetrical about the circumference.

Figure 4A:
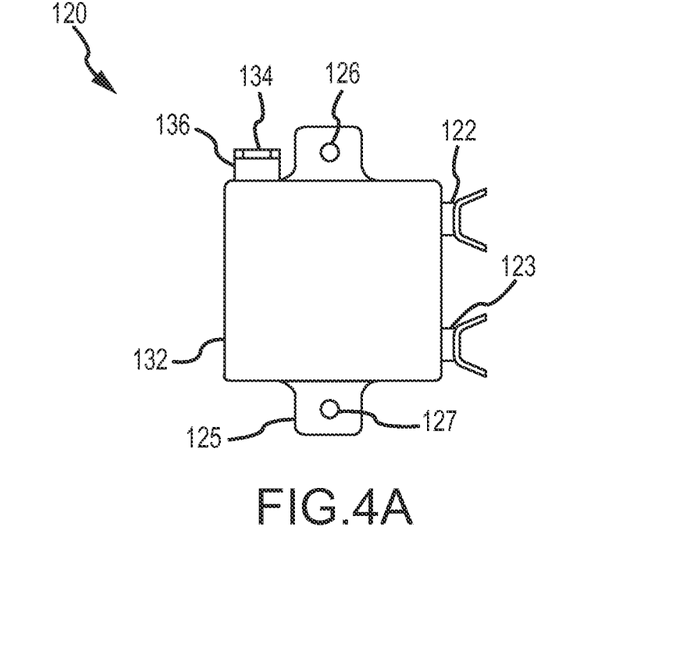
FIGS. 4A-4C are respective top, front, and side elevation views of a rectifier module, according to an exemplary embodiment.
Figure 4B:
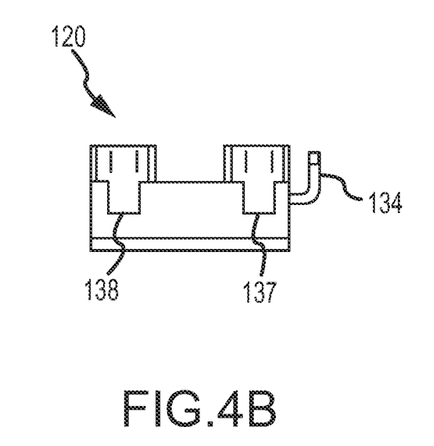
Figure 4C:
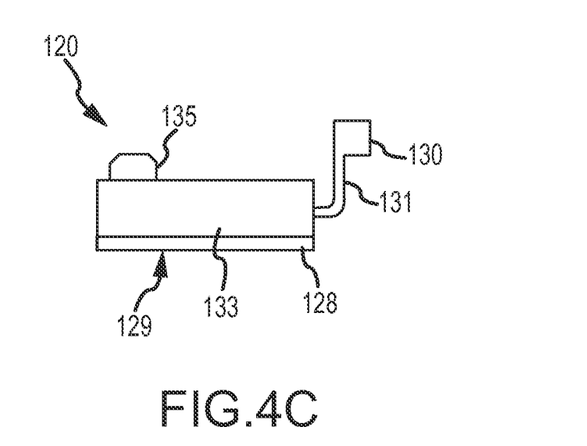

FIGS. 4A-4C are respective top, front, and side elevation views of a rectifier module 120, according to an exemplary embodiment. Module 120 has two phase lead input terminals 122, 123. Module 120 may include any number of terminals. A base portion 125 has mounting holes 126, 127 for securing module 120 to a heat sink 76-78 (FIG. 5), and has a substrate 128 typically including a heat transfer surface 129 for conducting heat out of module 120. Terminals 122, 123 each include a connection portion 130 for receiving and securing one or more phase leads, and a bus portion 131 for transferring electrical current between connection 130 and the electrical circuit within module 120. A B+ terminal 134 has a connection portion 135 and a bus portion 136 for transferring B+ voltage. A cover portion 132 has a body 133 of a same or different material respecting base 125, with passages formed for inserting bus portions 131 therethrough. For example, cover body 133 may be formed of a high temperature resin or other electrically nonconductive material and base portion 128 may be formed of a metal having a high thermal conductivity for sinking heat out of module 120. Terminals 122, 123 pass through body 133 at respective passages 137, 138 and are typically sealed and secured at such passages with potting compound, epoxy, or the like for ensuring that the conductive portions of terminals 122, 123 do not move or come in contact with any other conductive surface and that passages 137, 138 do not allow contaminants to enter the interior portion of module 120.

Figure 5:
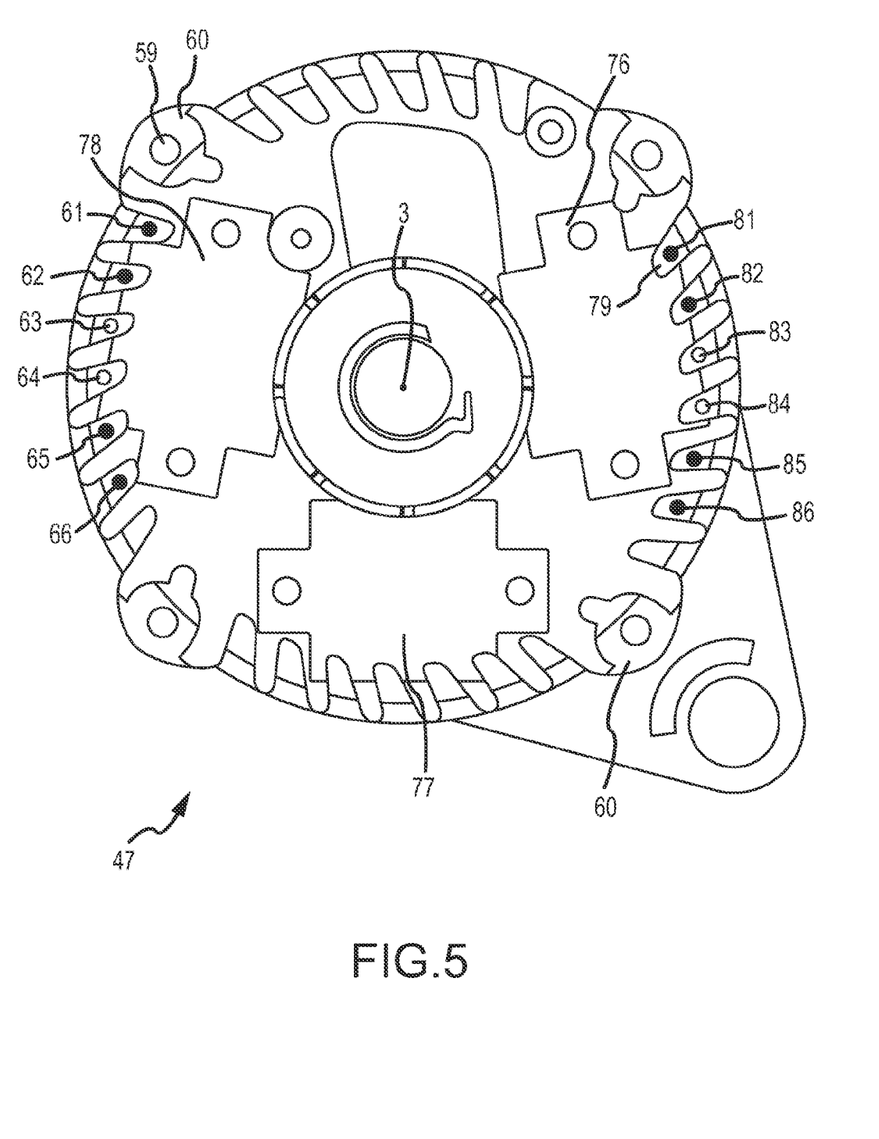
FIG. 5 is a top plan view of an alternator frame, according to an exemplary embodiment.

FIG. 5 is a top plan view of frame 47, according to an exemplary embodiment. A stator (not shown) has two separate three-phase windings and the six separate coils are labeled A1, B1, C1, A2, B2, C2. The stator coil A1 has phase leads 61, 62, coil B1 has phase leads 63, 64, coil C1 has phase leads 65, 66, coil A2 has phase leads 81, 82, coil B2 has phase leads 83, 84, and coil C2 has phase leads 85, 86, all phase leads extending generally axially out of the stator core (not shown). The two 3-phase winding sets may be used as a six-phase machine. Any other number of phases (e.g., 3ϕ, 5ϕ, 12φ, etc.) and an associated configuration may be chosen for the stator windings. The locations of stator phase leads 61-66 and 81-86 are shown in relation to center axis 3. For example, each phase lead 61-66, 81-86 may be approximately the same radial distance from center axis 3, or they may be oriented in an asymmetrical fashion. When phase leads 61-66 and 81-86 are the same radial distance from axis 3, they may occupy the same radial 'ring' as the four axial fasteners and associated hardware, namely the substantially same radial distance used by bolt holes 59 and surfaces 60. In such a case, the routing of phase leads 61-66 and 81-86 in the same radial ring used for the axial compression of an alternator effects a more efficient design by packaging more elements in the same space.

Figure 6A:
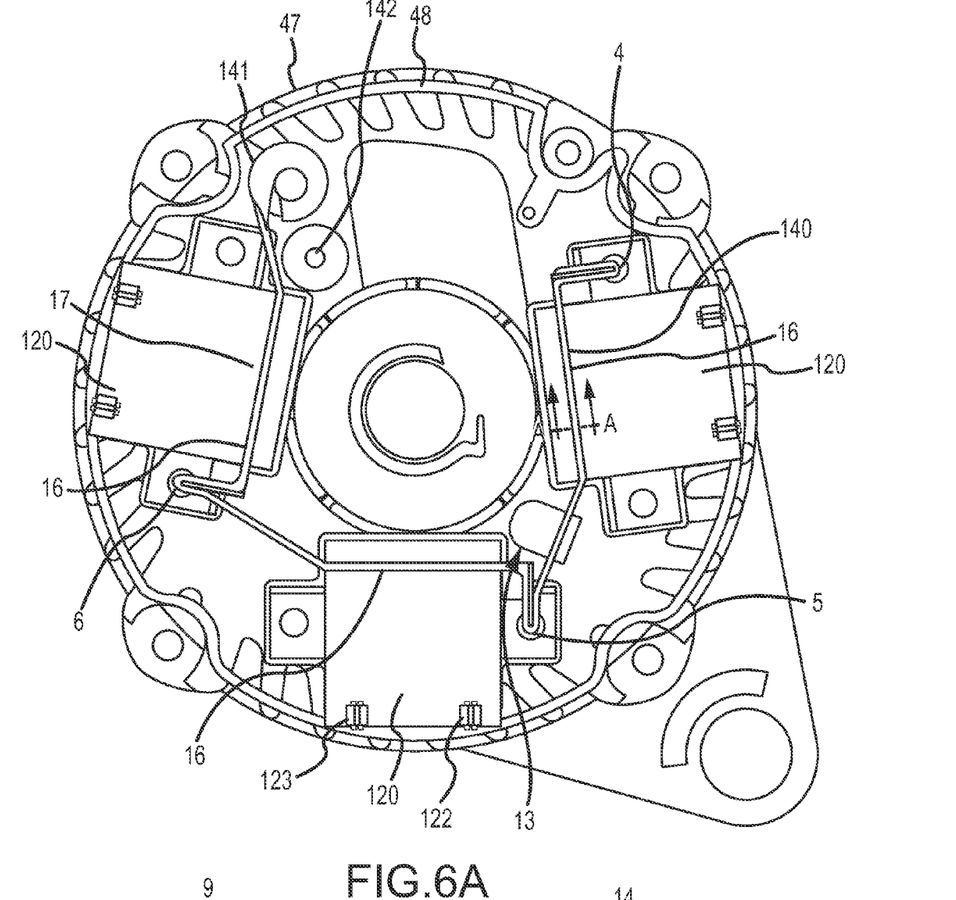
FIG. 6A is a top plan view of selected portions of an assembly that includes the frame of FIG. 5, a phase lead insulator, and three rectifier modules, according to an exemplary embodiment.

FIG. 6A is a top plan view of selected portions of an assembly that includes frame 47, phase lead insulator 48, and three rectifier modules 120. Terminals 122, 123 of each module 120 are shown bent back in a generally radially inward direction after attachment of respective phase leads thereto. For example, a welding tool (not shown) may crimp connection portion 130 (FIG. 4C) to an exposed conductor end of one or more phase leads, weld the connection, and bend the phase-connected terminals 122, 123 back onto module 120 to reduce the corresponding footprint. A B+ bus wire 140 joins together the B+ terminals 135 of each module 120 and extends to a termination loop 141 stamped into the shape of a ring terminal at an end of B+ bus bar 140. Ring terminal 141 is placed onto B+ stud 142.

Figure 6B:
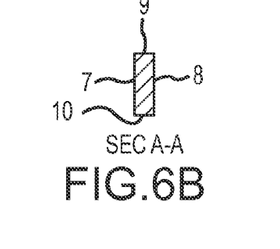
FIG. 6B is a cross-sectional view taken along the line A-A of FIG. 6A.

FIG. 6B is a cross-sectional view taken along the line A-A of FIG. 6A, and shows B+ bus bar 140 having a rectangular cross-sectional profile. Accordingly, B+ bus bar 140 may be referenced as having cross-sectionally long sides 7, 8 and cross-sectionally short sides 9, 10. As shown in FIG. 6A, long side 7 is wrapped around B+ terminal 134 (FIG. 4B) of each module 120 by being formed into respective bends 4, 5, 6 that each maximize the contact surface area between long side 7 and the three respective B+ terminals 134. By maximizing contact surface area, contact resistance between B+ bus bar 140 and terminals 134 is minimized.

Figure 6C:
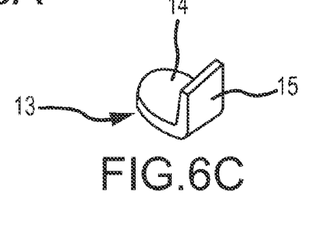
FIG. 6C shows a tab having an "L" shape formed by bending a copper strip into orthogonal portions, according to an exemplary embodiment.

FIG. 6C shows a tab 13 having an "L" shape formed by bending a copper strip into orthogonal portions 14, 15. A surface of extending portion 15 may be welded to a long side 8 prior to installation of B+ bus bar 140, and an axially inward surface of extending portion 14 may be soldered to a terminal of a voltage regulator (not shown), whereby a secure B+ biasing connection to the voltage regulator may be effected without a need for additional wiring or connector(s). Alternatively, tab 13 may be welded to B+ bus bar during the same welding process that includes crimping and welding bends 4-6 to B+ terminals 134 of modules 120. When B+ bus bar 140 is being installed, straight portions 16 may rest on top surface(s) 17 of one or more modules 120. For example, top surface 17 may include a retaining structure (not shown), may be electrically nonconductive, and/or may simply restrain movement of B+ bus bar 140 during the assembly/welding process.

Figure 7:
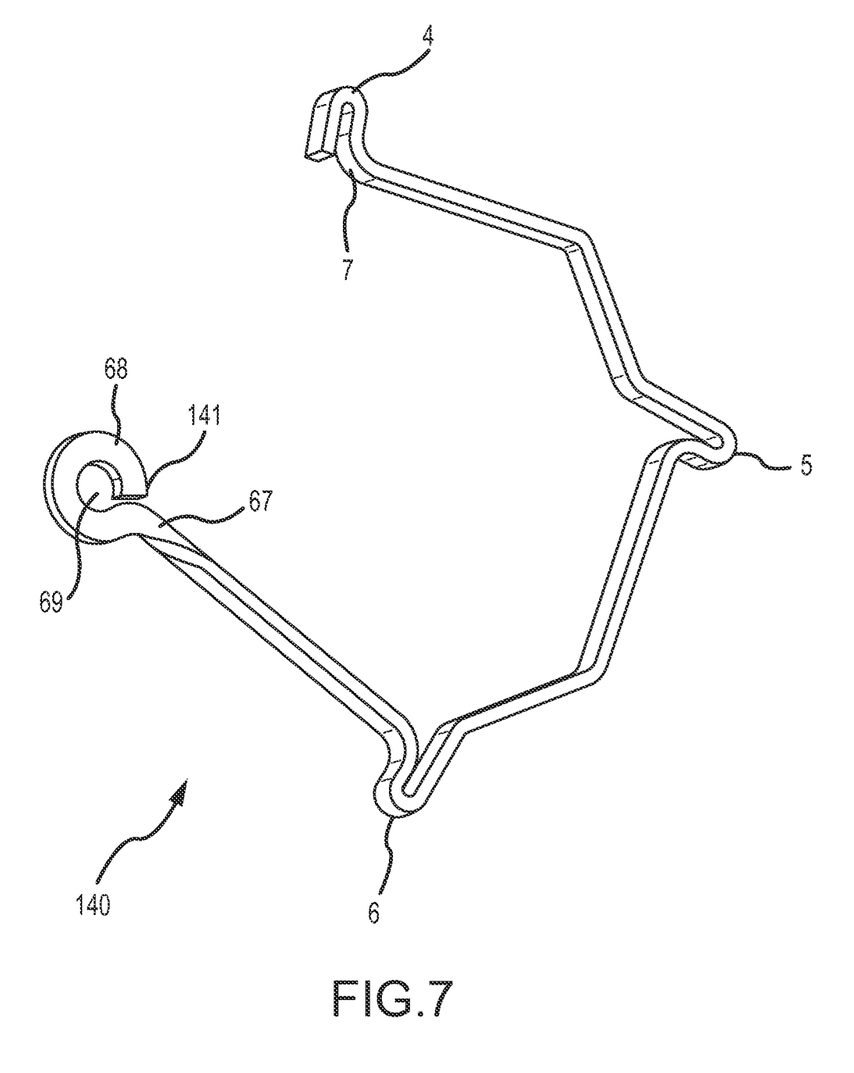
FIG. 7 is a perspective view of a B+ bus bar, according to an exemplary embodiment.

FIG. 7 is a perspective view of B+ bus bar 140, illustrating cross-sectionally long side 7 (FIG. 6B) of the conductor serving as the primary contact surface for engaging B+ terminals 134 (FIG. 4B) at bends 4-6. The endmost portion of B+ bus bar 140 is formed into termination loop 141 by being inserted into a form and bent into a circle, and a proximate portion of B+ bus bar 140 is twisted to form a ninety degree twist 67, whereby long side 7 is exposed for a subsequent stamping operation. The stamping form is shaped so that a resultant ring terminal 68 has flat top and bottom surfaces and a center opening 69 with a diameter slightly greater than the diameter of B+ stud 142 (FIG. 6A).

Figure 8:
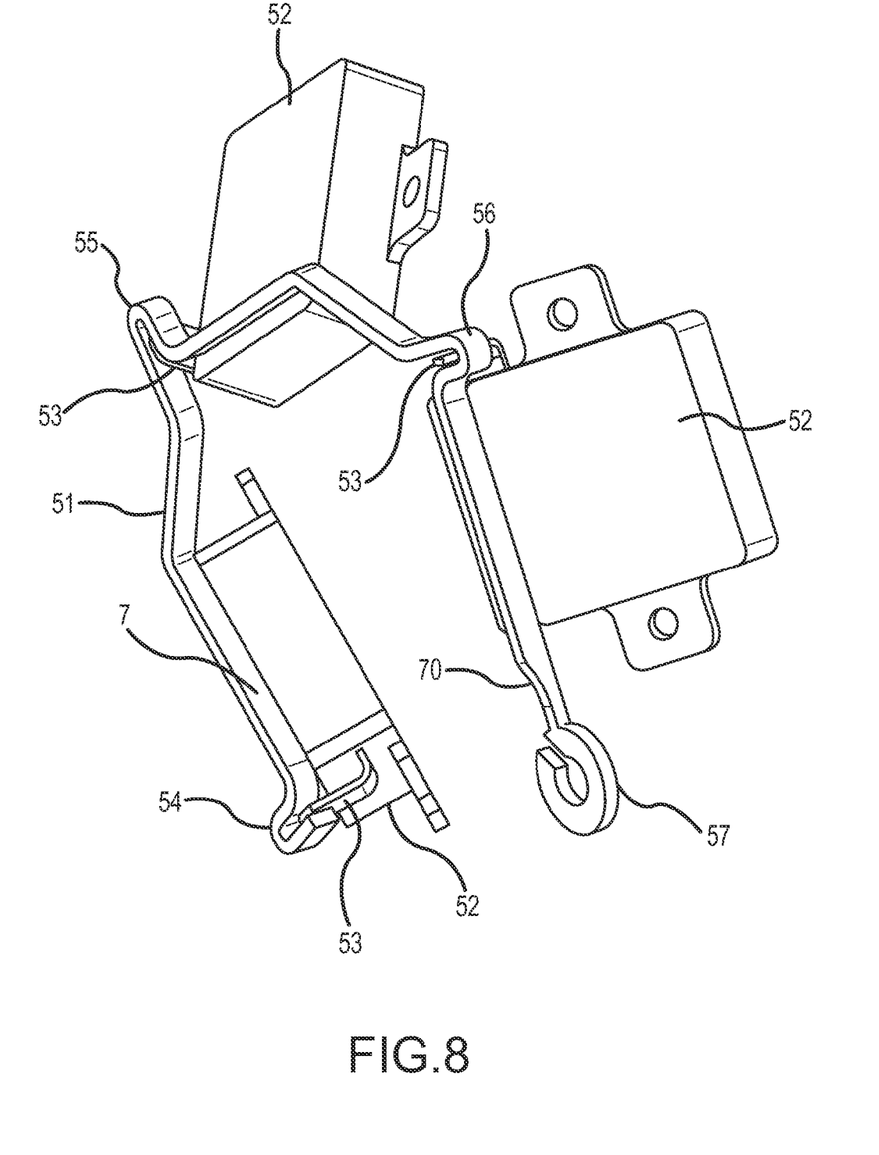
FIG. 8 is a perspective view of an exemplary embodiment having a copper B+ bus bar formed with an untwisted transition portion.

FIG. 8 is a perspective view of an exemplary embodiment having a copper B+ bus bar 51 formed with an untwisted transition portion 70 proximate the endmost portion that is stamped into ring terminal 57. In one variation, bend portions 54-56 of B+ bus bar 51 may be oriented diagonally with respect to the longitudinal axes of corresponding B+ terminals 53, thereby maximizing the surface area of long side 7 (FIG. 6B) that is in contact with terminals 53.

Figure 9:
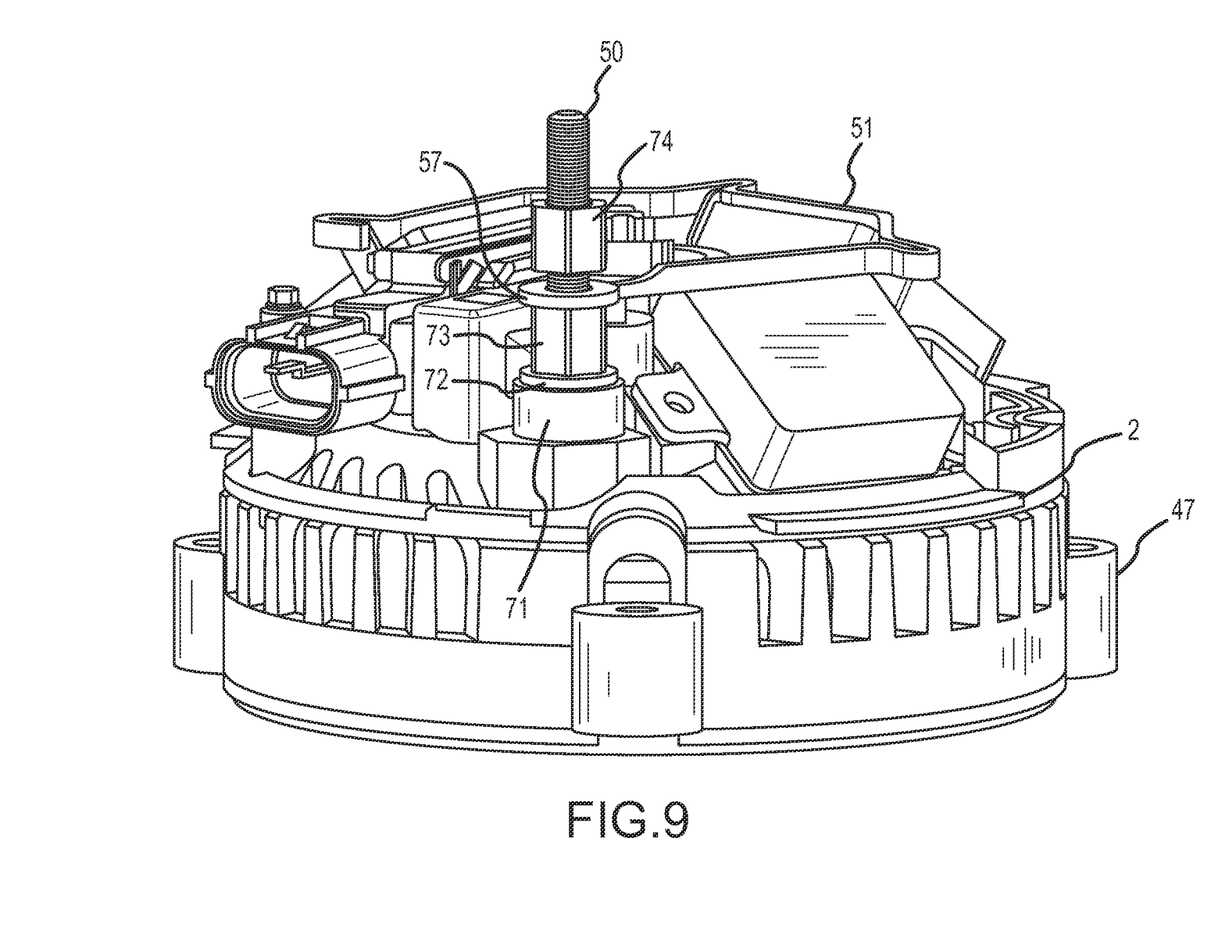
FIG. 9 is a perspective view of an exemplary embodiment having a ring terminal mounted on a B+ terminal post.

FIG. 9 is a perspective view of an exemplary embodiment having ring terminal 57 mounted on B+ terminal post 50 in a manner that facilitates the connection of a load cable thereto. In a typical assembly, B+ terminal post 50 may be inserted through a bolt hole in frame 47, described below, and through ring terminal 57 after B+ bus bar 51 has already been placed and welded. An annular insulator 71 is placed into the bolt hole and provides an electrically nonconductive center passage for B+ terminal post 50. A washer 72 and a lower nut 72 are tightened to secure B+ terminal post 50 to frame 47. B+ terminal post 50 rests on top of nut 73. The ring terminal of a customer B+ cable (load cable), described below, is placed onto B+ terminal post 50 in direct contact with ring terminal 57 and then nut 74 is placed and tightened onto B+ terminal post 50. A phase lead insulator 2 routes the end wires of stator phase coils (not shown) to rectifier modules 120.

Figure 10:
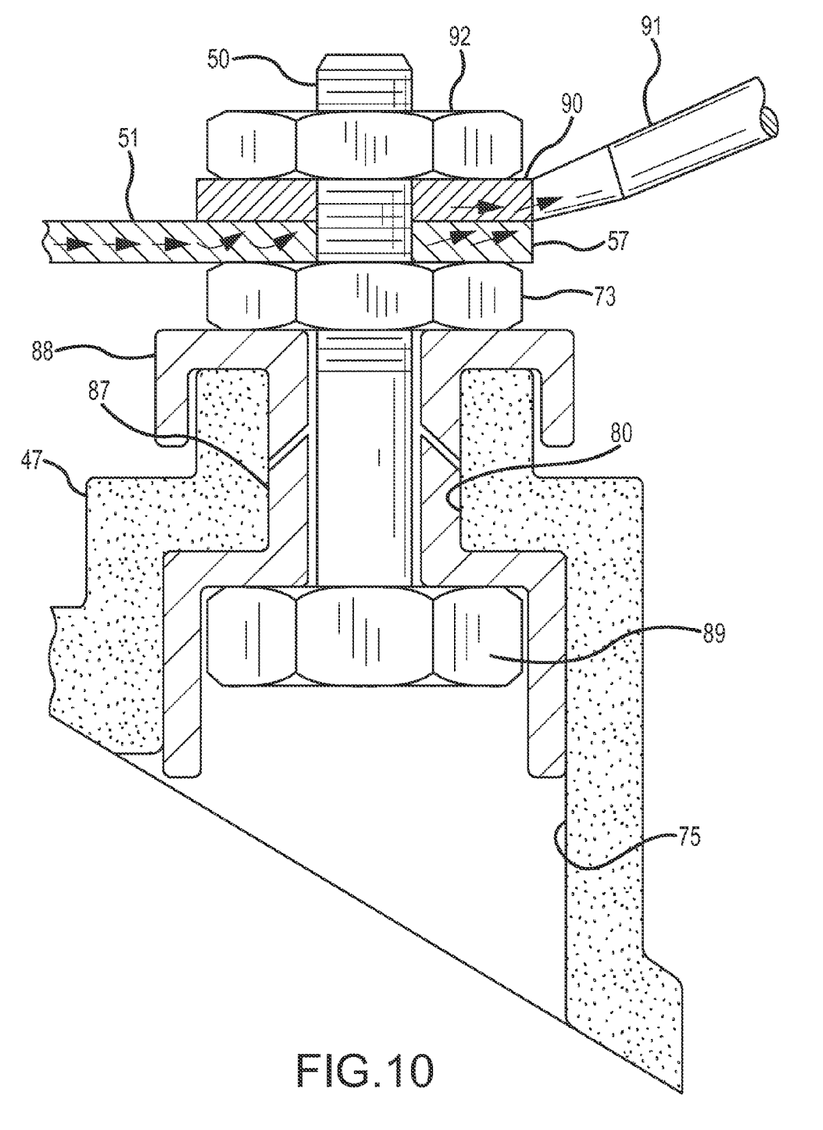
FIG. 10 is a cross-sectional elevation view of the structure of and connections to a B+ terminal post/stud, according to an exemplary embodiment.

FIG. 10 is a cross-sectional elevation view of the structure of and connections to B+ terminal post/stud 50, according to an exemplary embodiment. Frame 47 includes a cavity 75 that narrows to a bolt hole 80. High temperature, durable, annular insulators 87, 88 are placed to electrically insulate metal frame 47 from B+ stud 50 and associated hardware. For example, insulators 87, 88 may be formed of rubber, plastic, fiber, ceramic, or other suitable material. The two-piece structure of insulators 87, 88 facilitates easy assembly and larger insulating surfaces compared with unitary insulators. When insulators 87, 88 have been installed into frame 47, B+ stud 50 is placed therethrough and tightened with nut 73 to a specified torque that slightly compresses insulators 87, 88. The base portion 89 of B+ stud 50 may be a hexagonal bolt head or any other structure that allows B+ stud 50 to be held by a tool while being tightened into frame 47. One or more washers 72 (FIG. 9) may be placed where appropriate, such as between insulator 88 and nut 73 and/or between bolt head 89 and insulator 87. Ring terminal 57, formed as an integral end portion of B+ bus bar 51, is placed onto B+ stud 50 in direct contact with nut 73 or optional washer 72. A ring terminal 90 of a customer B+ cable (load cable) 91 is then placed onto B+ stud 50 in direct contact with ring terminal 57. Finally, a nut 92 is tightened onto B+ stud to compress ring terminals 57, 90 together. For example, nut 92 is tightened while holding nut 73 in place. Optionally, a washer (not shown) may be placed between nut 92 and ring terminal 90, or such washer may be formed as an integral portion of nut 92.

Figure 11:
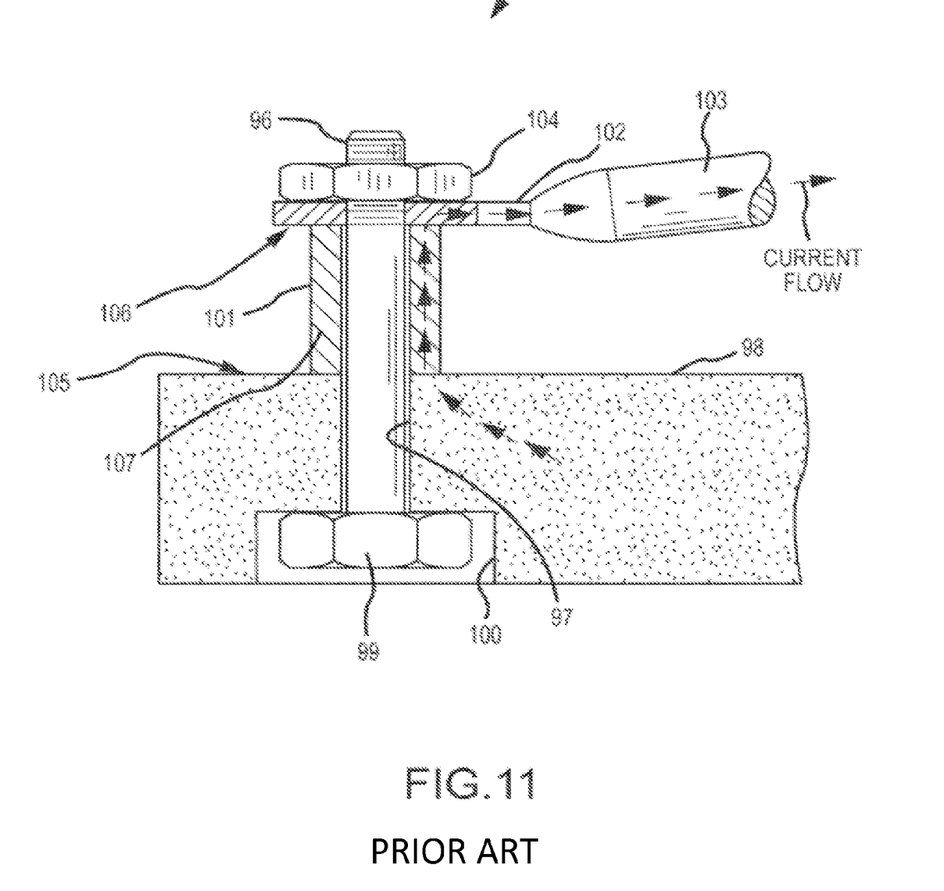
FIG. 11 is a cross-sectional elevation view of a conventional alternator B+ terminal assembly having current flow through a heat sink.

In a conventional alternator configuration that includes a diode bridge rectifier, the positive heat sink itself typically serves as an ersatz B+ connector. FIG. 11 is a cross-sectional elevation view of a conventional alternator B+ terminal assembly 95 having current flow through a heat sink. A steel stud 96 extends through a bolt hole 97 of a cast aluminum heat sink 98. A bolt head 99 of stud 96 fits within a cavity 100 of heat sink 98. An annular steel spacer 101 is placed onto B+ stud 96, and the copper ring terminal 102 of a customer B+ cable 103 is placed on top of spacer 101. Finally, a nut 104 is tightened onto B+ stud 96 to thereby compress and secure the assembly.

Comparing the respective B+ connection assemblies of FIGS. 10 and 11, conventional B+ assembly 95 has a current flow that passes through aluminum heat sink 98, spacer 101, and copper customer ring terminal 102. The interface 105 between steel spacer 101 and aluminum heat sink 98 and the interface 106 between steel spacer 101 and copper ring terminal 102 each have a contact resistance. In addition, there is a conduction resistance 107 inherent in steel spacer 101. By comparison, the current shown in FIG. 11 simply flows across the interface of copper ring terminals 57, 90. In an exemplary conventional B+ assembly 95, interface 105 is formed with a clamp torque of approximately 15 N·m. An associated clamp force is T/5 d, approximately 10 N·m (relaxed value)/(5·10 mm (head, not shank)/1000 mm/m), or 200N. Accordingly, the clamp stress is F/A, equal to $200N/(\pi/4)(10^2-7^2)$ mm$^2$, or 5.0 N/mm$^2$. The corresponding clamp resistance is $31,000/\rho^{1.1}=31,000/(5.0)^{1.1}=5278\cdot10^{-6}$ Ω/mm$^2$. Therefore, the resistance at interface 105 is approximately $(5278\cdot10^{-6}$ Ω/mm$^2)/((\pi/4)(10^2-7^2)$ mm$^2)=0.000132$Ω. The conduction resistance 107 is $(15.9\cdot10^{-6}$ Ω·cm$)(10$ mm/cm$)(25.4$ mm$)(1/((\pi/4)(10^2-7^2)$ mm$^2))=0.000101$Ω. Assuming that the contact resistance at interface 106 is the same as that for interface 105, the total B+ resistance for the conventional B+ assembly is 0.000101+ (0.000132)(2)=0.000365Ω. By comparison, the corresponding total B+ resistance for the high efficiency B+ connection configuration of FIG. 10, having two copper ring terminals in direct contact with one another, is approximately the same as the resistance at interface 105, or 0.000132Ω. The reduction in B+ connection resistance for the disclosed exemplary embodiment of FIG. 10, compared with conventional connection assembly 95 of FIG. 11, is therefore 100·((0.000365−0.000132)/0.000365)=64%.

Figure 12:
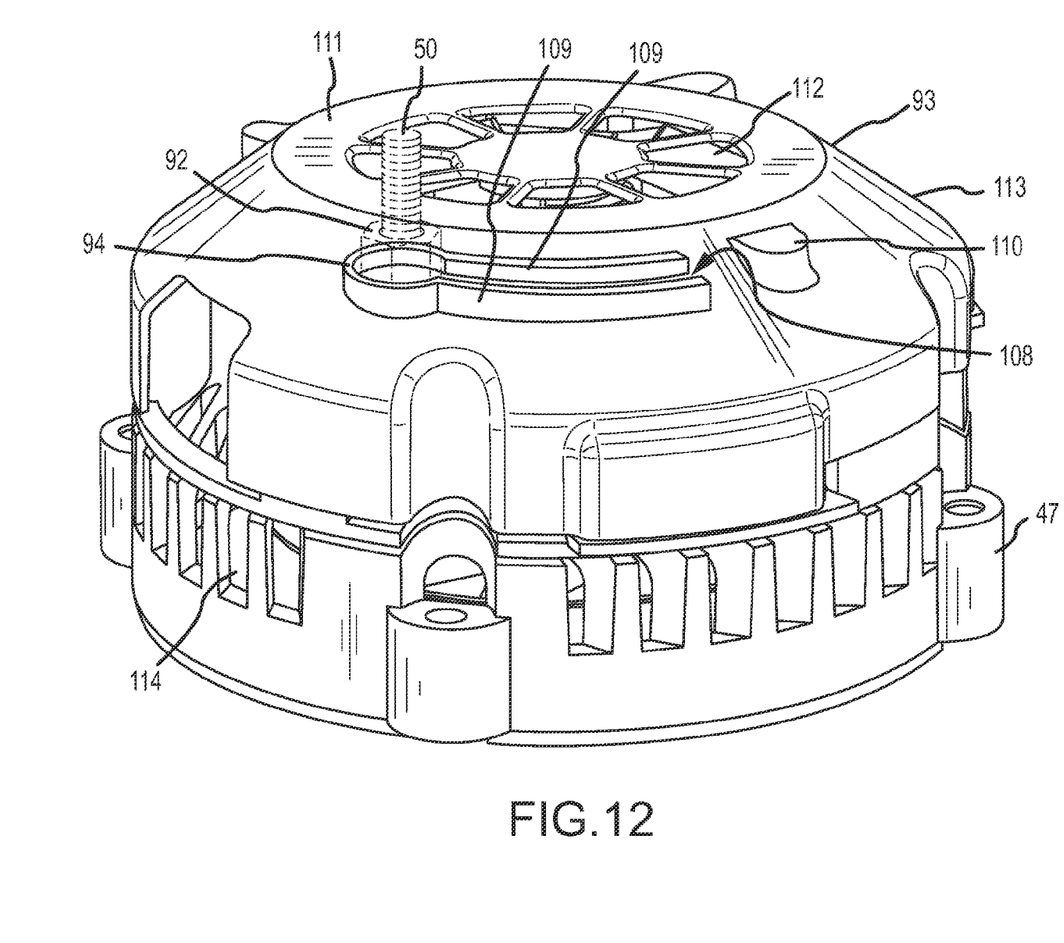
FIG. 12 is a perspective view of axial end portions of an alternator, including a cover, according to an exemplary embodiment.
Figure 13A:
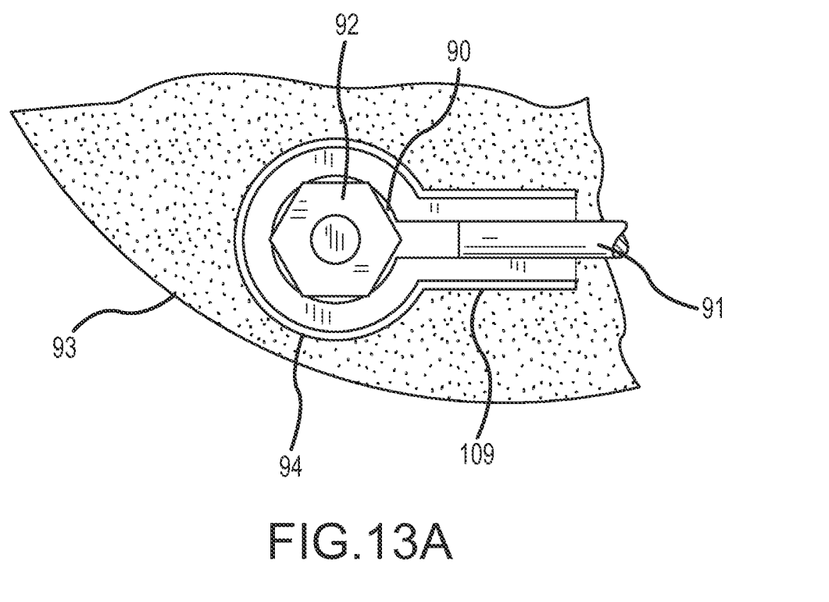
FIG. 13A is a top view and FIG. 13B is a perspective view of a B+ connection portion of the cover of FIG. 12.
Figure 13B:
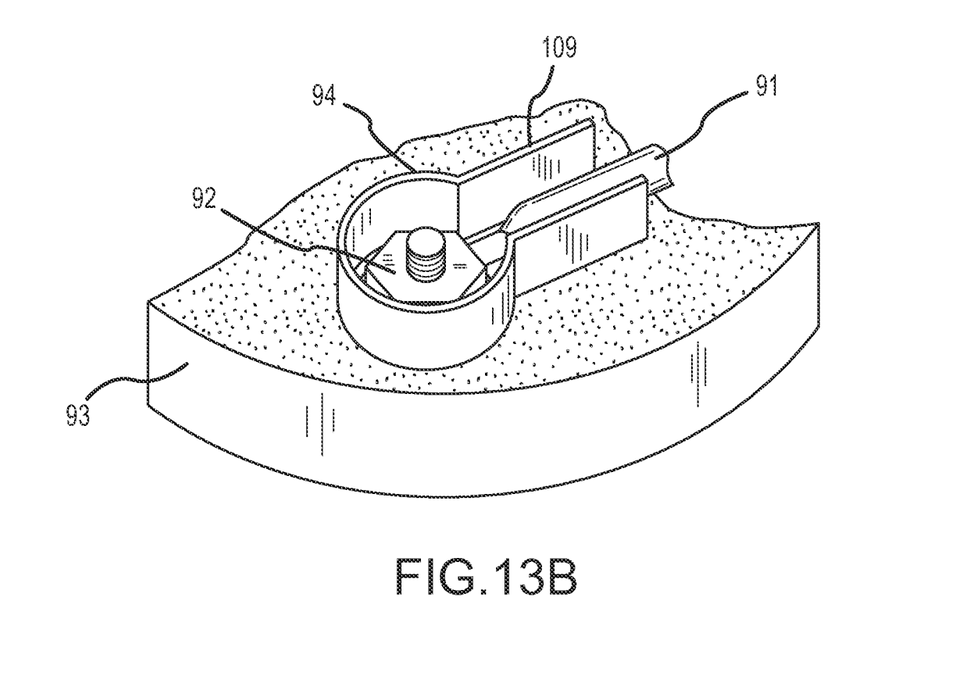

FIG. 12 is a perspective view of axial end portions of an alternator, including a cover 93, according to an exemplary embodiment. FIG. 13A is a top view and FIG. 13B is a perspective view of a B+ connection portion of cover 93. B+ stud 50 is secured to frame 47 (e.g., FIG. 10) and extends axially through an annular rim portion 94 of cover 93. Ring terminal 90 of customer B+ cable 91 is placed onto B+ stud 50 and cable 91 is placed into a channel 108 formed between side rims 109. For example, annular rim portion 94 may define a diameter slightly larger than the respective diameters of ring terminals 90, 57 (FIG. 10) and nut 92, whereby a nut driver (not shown) or the like may be placed for tightening nut 92, and whereby the annular portions of ring terminals 90, 57 are not in contact with cover 93. A cable guide 110 may be formed on cover 93 for routing customer B+ cable 91, such as at a bent portion thereof. Cover 93 may include a flat top surface 111 having air holes 112 formed therein, and may have an annular sloped side 113 that provides cover 93 with a conical type shape. Frame 47 includes exhaust ventilation holes 114.

Figure 14:
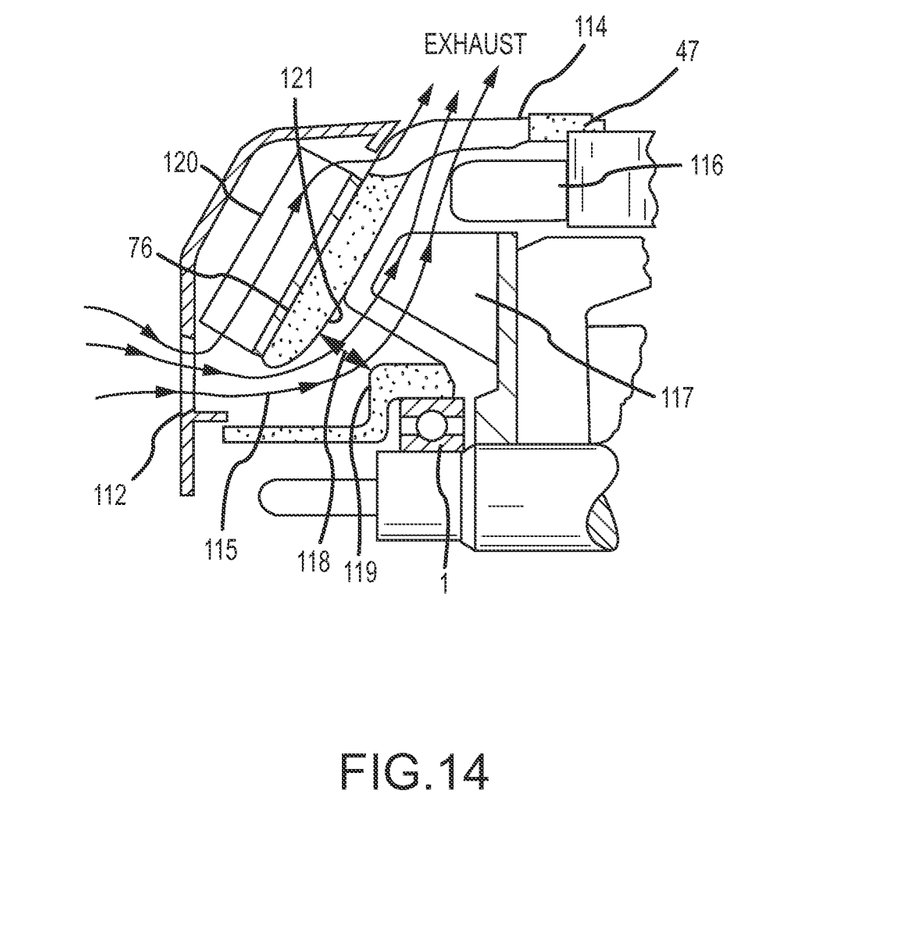
FIG. 14 is a cross-sectional elevation view, illustrating air flow through an axial end portion of an alternator, according to an exemplary embodiment.

FIG. 14 is a cross-sectional elevation view, illustrating air flow through an axial end portion of an alternator, according to an exemplary embodiment. Convection cooling is effected by airflow 115 entering air holes 112, passing through an interior portion that includes various heat-radiating surfaces and components, for example bearing assembly 1, modules 120, heat sink surface 76, stator end turns 116, frame 47, and others. Airflow 115 is produced by rotational movement of one or more fan blades 117. In an exemplary case, airflow 115 is constricted within the interior of an alternator at a narrow portion 118 having a general shape of a circumferential gap between generally annular opposed frame surfaces 119, 121. Surface 121 may be an angled back face of portions of frame 47 that include angled heat sink surfaces 76-78 (FIG. 5), and surface 119 may be a portion of a bearing hub. Circumferential gap 118 according to embodiments of the present invention provides a much greater cross-sectional convection area and a much smaller airflow restriction compared with a corresponding cross-sectional area and resultant airflow for conventional alternators. This is a result of optimizing interior space by reducing interconnections and routing associated with both interior and customer B+ connection of the alternator. In addition, the generally annular, exposed position of B+ bus bar 51, 140 (FIGS. 7, 8) may be provided within airflow 115, whereby heat produced within rectifier modules 120 may be conducted out of modules 120 into copper B+ bus bar 51, 140, where such heat is then removed by convection.

Although exemplary embodiments are herein described to include individual processes such as stamping, twisting, etc., any suitable manufacturing process and structure may be employed. For example, many different types of dies, presses, rolls, casting molds, forging and forming equipment, and others may be used.

Any connection between rectifier modules 120 may be made with reduced or eliminated contact resistance as a result of bonding or making unitary the corresponding structure, such as when one or more stator phase leads (not shown) are mated to a drain or source of a MOSFET, to an anode or cathode of a rectifier diode, and/or to a bus. In one exemplary embodiment, a chosen MOSFET configuration may have a plurality of heat sinks. In another exemplary embodiment, power control circuitry such as for voltage regulation, speed control, temperature control, sensor control, input/output of signals, direct control such as by closed loop algorithms, and/or for other purpose(s), may share conductive portions that include B+ bus bar 51, 140, and/or any other conductive surface such as a surface of a heatsink. Similarly, a B+ stud 50, 96 may be conductive and electrically insulated from frame 47 or, in alternative embodiments, B+ stud 50, 96 may be electrically nonconductive when B+ bus bar 51, 140 and customer B+ cable 91 are forcibly clamped directly in contact with one another, such as at respective ring terminals.

While various embodiments have been described in detail, further modifications and adaptations of the invention may occur to those skilled in the art. However, it is to be expressly understood that such modifications and adaptations are within the spirit and scope of the present invention.

What is claimed is:
1. An alternator, comprising:
   a B+ bolt;
   a plurality of rectifier B+ terminals;
   a bus conductor having a plurality of bends, each of the plurality of bends surrounding a respective individual one of the plurality of rectifier B+ terminals and having an end formed into a bus ring terminal; and
   a stop;
   wherein the bus ring terminal is placed onto the B+ bolt and wherein a load cable ring terminal may be placed onto the B+ bolt in direct contact with the bus ring terminal and compressed thereto by the stop.
2. The alternator of claim 1, wherein the stop is a nut.
3. The alternator of claim 1, wherein the bends are crimped and welded to the respective rectifier B+ terminals.
4. The alternator of claim 1, further comprising a plurality of rectifier modules each having a respective one of the rectifier B+ terminals, the modules each having an electrically insulative cover, wherein the bus conductor rests on at least one of the module covers.
5. The alternator of claim 1, further comprising a plurality of rectifier modules each having a respective one of the rectifier B+ terminals, wherein the bus conductor is copper and is operable to transfer heat out of the rectifier modules.
6. The alternator of claim 1, wherein the bus conductor has a substantially rectangular cross-sectional profile, and wherein one of the long sides of the bus conductor is crimped to engage the rectifier B+ terminals at the respective bends.

7. The alternator of claim 6, wherein the end of the bus conductor is stamped to form the bus ring terminal.

8. The alternator of claim 7, further comprising a housing end cover having a hole for passing the B+ bolt therethrough, the housing end cover having a channel structured for accepting and retaining a load cable placed therein.

9. The alternator of claim 6, wherein the end of the bus conductor is twisted about ninety degrees and stamped to form the bus ring terminal.

10. A method of connecting B+ on an alternator having a plurality of rectifier B+ terminals and a B+ stud, comprising:
   bending a copper bus conductor so that one side of the bus conductor surrounds and abuts each of the rectifier B+ terminals;
   shaping one end of the bus conductor into a ring terminal;
   placing the ring terminal of the bus conductor onto the B+ stud; and
   wherein the copper bus conductor has a substantially rectangular cross-sectional profile, and wherein the one side of the bus conductor that surrounds and abuts each of the rectifier B+ terminals is a cross-sectionally long side of the bus conductor.

11. A method of connecting B+ on an alternator having a plurality of rectifier B+ terminals and a B+ stud, comprising:
   bending a copper bus conductor so that one side of the bus conductor surrounds and abuts each of the rectifier B+ terminals;
   shaping one end of the bus conductor into a ring terminal;
   placing the ring terminal of the bus conductor onto the B+ stud; and
   wherein the shaping comprises twisting the end of the bus conductor about ninety degrees and stamping the end to form the bus conductor ring terminal.

12. A method of connecting B+ on an alternator having a plurality of rectifier B+ terminals and a B+ stud, comprising:
   bending a copper bus conductor so that one side of the bus conductor surrounds and abuts each of the rectifier B+ terminals;
   shaping one end of the bus conductor into a ring terminal;
   placing the ring terminal of the bus conductor onto the B+ stud; and
   further comprising crimping and welding the bus conductor to each of the rectifier B+ terminals.

13. A method of connecting B+ on an alternator having a plurality of rectifier B+ terminals and a B+ stud, comprising:
   bending a copper bus conductor so that one side of the bus conductor surrounds and abuts each of the rectifier B+ terminals;
   shaping one end of the bus conductor into a ring terminal;
   placing the ring terminal of the bus conductor onto the B+ stud; and
   wherein the alternator further comprises a plurality of rectifier modules each having an electrically insulative cover and a respective one of the rectifier B+ terminals, the method further comprising resting the bus conductor on at least one of the rectifier modules.

14. A method of connecting B+ on an alternator having a plurality of rectifier B+ terminals and a B+ stud, comprising:
   bending a copper bus conductor so that one side of the bus conductor surrounds and abuts each of the rectifier B+ terminals;
   shaping one end of the bus conductor into a ring terminal;
   placing the ring terminal of the bus conductor onto the B+ stud; and
   further comprising placing a load cable ring terminal onto the B+ stud in direct contact with the bus conductor ring terminal.

15. A method of connecting B+ on an alternator having a plurality of rectifier B+ terminals and a B+ stud, comprising:
   providing a plurality of rectifier modules each having one of the B+ terminals surrounded by an electrically insulative cover;
   coupling the B+ terminals and the B+ stud together with a copper bus conductor; and
   cooling the copper bus conductor.

16. The method of claim 15, wherein the cooling is by convection.

17. The method of claim 15, further comprising resting the copper bus conductor against at least one of the electrically insulative covers.

18. The method of claim 15, wherein the coupling comprises bending the copper bus conductor so that one side of the bus conductor surrounds and abuts each of the rectifier B+ terminals.

19. The method of claim 18, wherein the copper bus conductor has a substantially rectangular cross-sectional profile, and wherein the one side of the bus conductor that surrounds and abuts each of the rectifier B+ terminals is a cross-sectionally long side.

* * * * *